US007532804B2

(12) United States Patent
Kim

(10) Patent No.: US 7,532,804 B2
(45) Date of Patent: May 12, 2009

(54) METHOD AND APPARATUS FOR VIDEO COPY DETECTION

(75) Inventor: Changick Kim, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 1120 days.

(21) Appl. No.: 10/778,464

(22) Filed: Feb. 13, 2004

(65) Prior Publication Data

US 2004/0258397 A1   Dec. 23, 2004

Related U.S. Application Data

(60) Provisional application No. 60/480,758, filed on Jun. 23, 2003.

(51) Int. Cl.
*H04N 5/91* (2006.01)
(52) U.S. Cl. .......................................... 386/94; 386/46
(58) Field of Classification Search .................. 386/46, 386/94, 95; 348/700; 375/240.08, 240.24, 375/240.26, 240.07; 707/104.1
See application file for complete search history.

(56) References Cited

U.S. PATENT DOCUMENTS

| | | | |
|---|---|---|---|
| 5,805,746 A | 9/1998 | Miyatake et al. |
| 5,933,499 A | 8/1999 | Enari |
| 5,960,081 A | 9/1999 | Vynne et al. |
| 5,987,456 A | 11/1999 | Ravela et al. |
| 6,070,171 A | 5/2000 | Snyder et al. |
| 6,141,464 A | 10/2000 | Handley |
| 6,240,423 B1 | 5/2001 | Hirata |
| 6,266,429 B1 | 7/2001 | Lord et al. |
| 6,285,774 B1 | 9/2001 | Schumann et al. |
| 6,285,995 B1 | 9/2001 | Abdel-Mottaleb et al. |
| 6,332,030 B1 | 12/2001 | Manjunath et al. |
| 6,347,144 B1 | 2/2002 | Park |
| 6,373,979 B1 | 4/2002 | Wang |
| 6,381,367 B1 | 4/2002 | Ryan |
| 6,389,417 B1 | 5/2002 | Shin et al. |
| 6,404,925 B1 | 6/2002 | Foote et al. |
| 6,487,311 B1 | 11/2002 | Gal et al. |
| 6,577,766 B1 | 6/2003 | Standridge |
| 6,675,174 B1 | 1/2004 | Bolle et al. |
| 6,751,363 B1 | 6/2004 | Natsev et al. |
| 6,930,803 B1 | 8/2005 | Suzuki |
| 6,990,233 B2 | 1/2006 | Park et al. |

(Continued)

FOREIGN PATENT DOCUMENTS

EP     1 195 692     4/2002

(Continued)

OTHER PUBLICATIONS

Kim, C., et al., "Spatiotemporal Sequence Matching for Efficient Video Copy Detection", IEEE Transactions on Circuits and Systems for Video Technology, vol. 15, No. 1, Jan. 2005, pp. 127-132.

(Continued)

*Primary Examiner*—Thai Tran
*Assistant Examiner*—Mishawn Dunn

(57) ABSTRACT

A method for a matching technique for detecting copies of a video clip is provided. The method includes comparing temporal trails of intensity distributions between frames of the video clip and frames of a target video. A computer readable media, a computer system and integrated circuit for video copy detection are also provided.

11 Claims, 11 Drawing Sheets

U.S. PATENT DOCUMENTS

| | | | |
|---|---|---|---|
| 7,127,106 | B1 | 10/2006 | Neil et al. |
| 7,167,574 | B2 | 1/2007 | Kim |
| 2001/0046332 | A1 | 11/2001 | Chang |
| 2002/0186305 | A1 | 12/2002 | Atkin |
| 2003/0033347 | A1 | 2/2003 | Bolle et al. |
| 2003/0174859 | A1 | 9/2003 | Kim |
| 2004/0013302 | A1 | 1/2004 | Ma et al. |
| 2004/0258397 | A1 | 12/2004 | Kim |

FOREIGN PATENT DOCUMENTS

| | | |
|---|---|---|
| EP | 1 345 160 | 9/2003 |
| GB | 2 267 598 | 12/1993 |
| JP | 2004-7552 | 1/2004 |

OTHER PUBLICATIONS

Hsu, W., et al., "An Integrated Color-Spatial Approach to Content-based Image Retrieval", in Proc. ACM Multimedia, 1995, pp. 305-313.

A.K. Jain, et al., "Query by Video Clip", Multimedia Systems Journal, vol. 7, No. 5, 1999, pp. 369-384.

Swain, M., et al., "Color Indexing", International Journal of Computer Vision, vol. 7, No. 1, 1991, pp. 11-32.

Lau, T. K., et al., "Performance Analysis of Clustering Algorithms for Information Retrieval in Image Databases", Neural Networks Proceedings, 1998, IEEE World Congress on Computational Intelligence. vol. 2, May 4-9, 1998, pp. 932-937.

Arun Hampapur and Ruud M. Bolle, "Comparison of Distance Measures for Video Copy Detection", in *Proc. IEEE International Conference on Multimedia and Expo* (ICME), 2001.

Edward Y. Chang, James Ze Wang, Chen Li and Gio Wiederhold, "Rime: A Replicated Image Detector for the World-Wide-Web," in *Proc. SPIE Multimedia Storage and Archiving Systems III*, Nov. 1998.

Dinkar N. Bhat and Shree K. Nayar, "Ordinal Measures for Image Correspondence," *IEEE Trans. Pattern Analysis and Machine Intelligence*, vol. 20, No. 4, Apr. 1998, pp. 415-423.

Rakesh Mohan, "Video Sequence Matching," in *Proc International Conference on Audio, Speech and Signal Processing (ICASSP), IEEE*, pp. 3697-3700, 1998.

Milind R. Naphade, Minerva M. Yeung and Boon-Lock Yeo, "A novel scheme for fast and efficient video sequence matching using compact signatures," in *Proc. SPIE conference on Storage and retrieval for Media Databases*, SPIE vol. 3972, pp. 564-572, Jan. 2000.

Changick Kim, "Ordinal Measure of DCT Coefficients for Image Correspondence and Its Application to Copy Detection," in *Proc. SPIE-5021 Storage and Retrieval for Media Databases 2003*, pp. 199-210, Santa Clara, Jan. 2003.

Changick Kim, "Content-Based Image Copy Detection," *Signal Processing: Image Communication*, vol. 18 (3), pp. 169-184, Mar. 2003.

Dinkar N. Bhat and Shree K. Nayar, "Ordinal Measures for Visual Correspondence," Columbia Univ., Computer Science, Tech. Rep. CUCS-009-96, Feb. 1996.

Arun Hampapur and Ruud Bolle, "Feature Based Indexing For Media Tracking," in *Proc. IEEE International Conference on Multimedia and Expo (ICME)*, pp. 67-70, 2000.

V. Kobla, et al., "Indexing and Retrieval of the MPEG Compressed Video", Journal of Electronic Imaging, vol. 7(2), Apr. 1998, pp. 294-307.

N. Dimitrova, et al., "Content-Based Video Retrieval by Example Video Clip", proceedings of the SPIE, vol. 3022, 1997, pp. 59-70.

D. DeMenthlon, et al., "Video Summarization by Curve Simplification", Proceedings of the ACM Multimedia '98, Sep. 12, 1998, pp. 211-218.

"Video Copy Detection Using Spatio-Temporal Sequence Matching", C. Kim, *Storage and Retrieval Methods and Applications for Multimedia 2004*, vol. 5307, Jan. 2004, pp. 70-79.

"An Efficient Algorithm for Video Sequence Matching Using the Modified Hausdorff Distance and the Directed Divergence", S. Kim, et al., *IEEE Transactions on Circuits and Systems for Video Technology*, vol. 12, No. 7, Jul. 2002, pp. 592-596.

"Comparison of Sequence Matching Techniques for Video Copy Detection", A. Hampapur, et al., *Storage and Retrieval for Media Databases 2002*, SPIE vol. 4676, Dec. 2001, pp. 194-201.

Rao, C. R., et al., "View-invariant Alignment and Matching of Video Sequences", Proceedings of the Ninth IEEE International Conference on Computer Vision, 2003, pp. 1-7.

Zhu, S., et al., "A New Diamond Search Algorithm for Fast Block-Matching Motion Estimation", IEEE Transactions on Image Processing, vol. 9, No. 2, Feb. 2000, pp. 287-290.

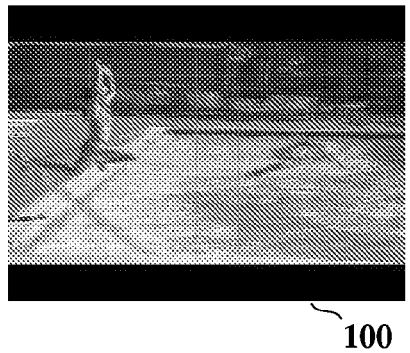
100
Fig. 1A
*(prior art)*
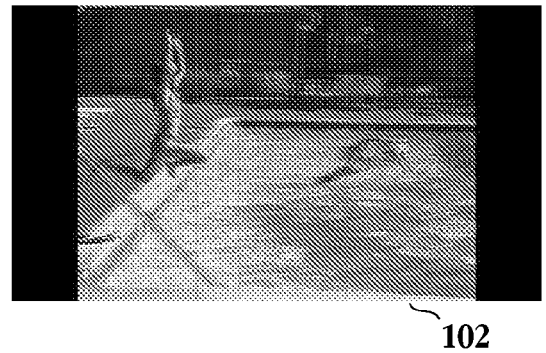
102
Fig. 1B
*(prior art)*
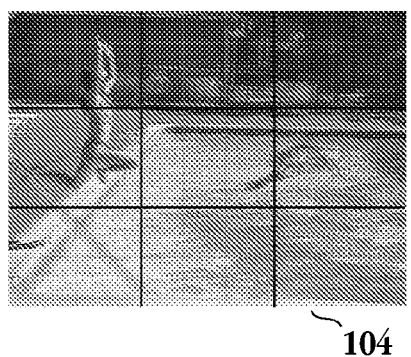
104
Fig. 2A
| 64 | 61 | 46 |
|----|----|----|
| 135 | 146 | 116 |
| 185 | 174 | 145 |
106
Fig. 2B
$$\begin{bmatrix} 3 & 2 & 1 \\ 5 & 7 & 4 \\ 9 & 8 & 6 \end{bmatrix}$$
108
Fig. 2C

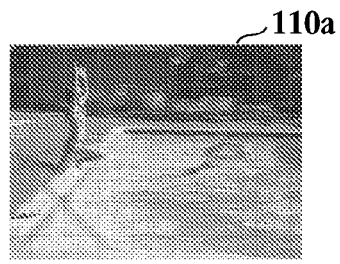 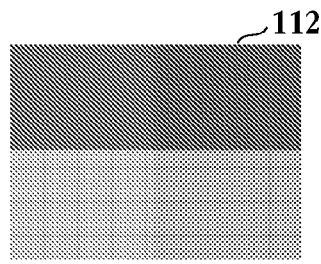 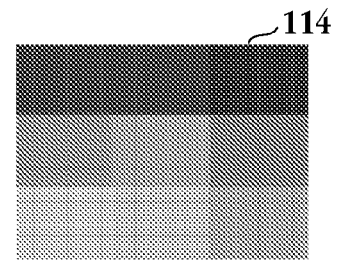
Fig. 3A-1  Fig. 3A-2  Fig. 3A-3
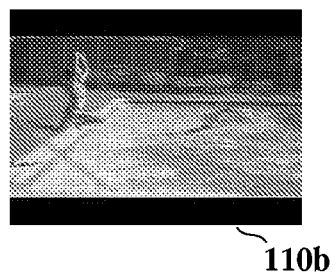 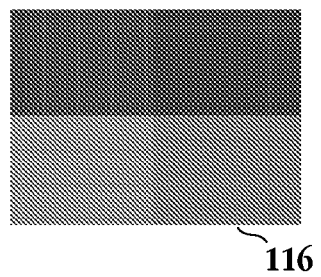 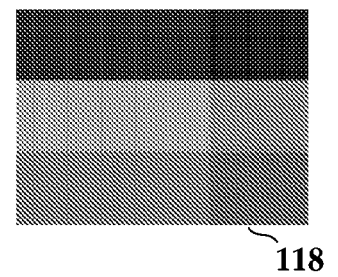
Fig. 3B-1  Fig. 3B-2  Fig. 3B-3
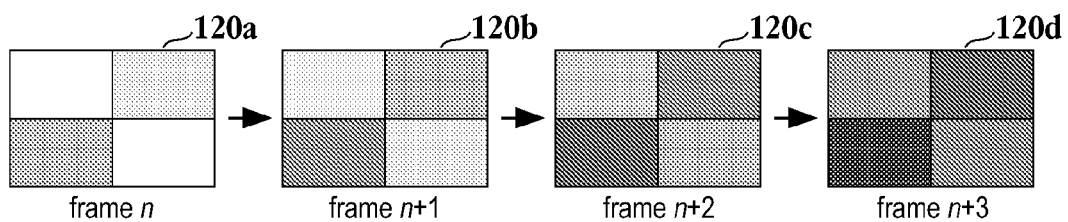
Fig. 4A
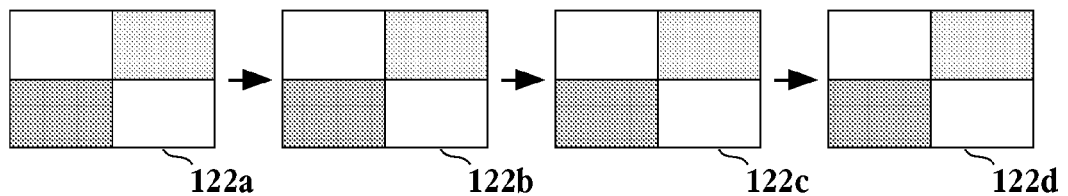
Fig. 4B

METHOD AND APPARATUS FOR VIDEO COPY DETECTION

CROSS REFERENCE TO RELATED APPLICATIONS

This application claims priority under 35 USC § 119(e) from: (1) U.S. Provisional Patent Application No. 60/480,758, filed Jun. 23, 2003, and entitled "VIDEO COPY DETECTION USING ORDINAL MEASURE OF TEMPORAL VARIATION." This application is related to U.S. patent application Ser. No. 10/263,423 filed Oct. 1, 2002, and entitled "METHOD AND APPARATUS FOR CONTENT-BASED IMAGE COPY DETECTION." Each of these applications is herein incorporated by reference in their entirety for all purposes.

BACKGROUND OF THE INVENTION

1. Field of the Invention

This invention relates generally to digital video technology and more particularly to a method and apparatus for detecting unauthorized copies of video data based on the spatial and temporal content of the video data.

2. Description of the Related Art

The success of the Internet and the widespread availability of cost-effective digital storage devices have made it possible to replicate, transmit, and distribute digital content in an effortless way. Thus, the protection of Intellectual Property Rights (IPR), especially with respect to copyrights of digital images, has become a crucial legal issue. In particular, detecting copies of digital media (images, audio and video) is a basic requirement for those investigating possible copyright violations. Two applications of copy detection in use include usage tracking and copyright violation enforcement.

Currently, there are two approaches commonly used to protect a copyright of a digital image: watermarking and content-based copy detection. As is generally known, watermarking embeds information into the image prior to distribution. Thus, all copies of the marked content contain the watermark, which can be extracted, to prove ownership. For content-based copy detection additional information, beyond the image itself, is not required. Generally, the image or video contains enough unique information that can be used for detecting copies, especially illegally distributed copies. For instance, if an owner of an image or video suspects that the image is being illegally distributed on the Internet, the owner can raise a query to a copy detection system. It should be appreciated that the content-based copy detection can also be a complementary approach to watermarking. After the copy detector provides a creator or a distributor with a suspect list, the actual owner of the media can use a watermark or other authentication techniques to prove ownership.

Content-based copy detection schemes extract signatures from the original images. The same signature, extracted from the test image, is compared to the original image signature to determine if the test image is a copy of the original image. The key advantage of the content-based copy detection over watermarking is the fact that the signature extraction is not required to be conducted before the image is distributed. However, copies that are not the same as the original, i.e., copies that are slightly modified, may not be detected. For example, a third party may generate various modifications to avoid copy detection or enhance image quality which may cause the content based copy detection system not to detect the copy.

Color histogram-based methods, such as the histogram intersection method, have been used in content-based image/video retrieval systems. However, they are not suitable for copy detection systems since the color histogram does not preserve information about the spatial distribution of colors. Another method which can consider the pixel locations is the partition based approach. In this method, the image is divided into sub-images. In one such method, the color information of each partition is obtained by a local color histogram. The similarity of two images is measured by comparing their local color histogram, and by considering the similarity of all the sub-images. However, this method comes at a high computational cost and requires a long search time. Additionally, this method will not detect images that have their spatial outlay modified.

The traditional video matching techniques have predominantly relied on image correspondence. The distance between two video sequences is computed by combining dissimilarities of corresponding frames. One challenge for video matching is that the different digitizing and encoding processes give rise to several distortions, such as changes in brightness, shifts in hue, changes in saturation, different blocky artifacts, and so on. That is, most of the currently available techniques focus on coping with slight color distortions introduced by different encoding parameters. However, it should be noted that techniques to deal with aspect ratio conversions must be considered because those conversions are frequently made in practice to fit different displays. For example, the video streams may be displayed in a 4:3 or 16:9 aspect ratio. Traditional video matching techniques are not capable of accommodating the changes in aspect ratios so that copies having different aspect ratios are identified. FIGS. 1A and 1B illustrate common techniques used to change aspect ratios for video data. Video frame 100 of FIG. 1A illustrates video frame 100 in which a "letter box" approach is used to scale down the aspect ratio of a video. FIG. 1B illustrates video frame 102 in which a "pillar box" approach is used to modify the aspect ratio of a video. In addition to being unable to accommodate the aspect ratio changes, the traditional video matching techniques, e.g., key frame based approaches, correlation based methods, ordinal measuring techniques, etc., fail to consider the temporal aspects of a video stream. The failure to notice the temporal variation of videos may lead to many false detections of copies.

As a result, there is a need to solve the problems of the prior art to provide a method and apparatus for robust and efficient video copy detection where the copy's aspect ratio has been modified.

SUMMARY OF THE INVENTION

Broadly speaking, the present invention fills these needs by providing a method and system for video copy detection unaffected by aspect ratio changes or slight distortions of content, considering the temporal aspects of video streams. It should be appreciated that the present invention can be implemented in numerous ways, including as a method, a system, computer readable media or a device. Several inventive embodiments of the present invention are described below.

In one embodiment, a method for detecting whether video data appears in a target video is provided. The method initiates with calculating a spatial distance between two spatial signatures associated with the video data and the target video. The method includes calculating a temporal distance between two temporal signatures associated with the video-data and the target video. Then, the spatial distance and the temporal distance are combined. It is then determined whether the video data appears in the target video, where the determination is based upon the combined distance. The spatial distance and the temporal distance are calculated from corresponding spatial signature values and temporal signature values as described herein.

In another embodiment, a method for detecting copies of a video clip is provided. The method initiates with partitioning both a frame of the video clip and a frame of a target video so that ordinal measures associated with the target video are invariant when an aspect ratio associated with the target video changes. The method includes determining a dissimilarity value between the frame of the video clip and the frame of the target video.

In yet another embodiment, a method for a matching technique for detecting copies of a video clip are provided. The method initiates with comparing temporal trails of intensity distributions between frames of the video clip and frames of a target video.

In still yet another embodiment, a computer readable medium having program instructions for detecting whether video data appears in a target video is provided. The computer readable medium includes program instructions for calculating a spatial signature value associated with the video data and the target video and program instructions for calculating a temporal signature value associated with the video data and the target video. Program instructions for combining the spatial signature value and the temporal signature value are provided. Program instructions for determining whether the video data appears in the target video based upon the combined value are included.

In another embodiment, a computer readable medium having program instructions for detecting copies of a video clip are provided. The computer readable medium includes program instructions for partitioning a frame of the video clip and a frame of a target video so that ordinal measures associated with the target video are invariant when an aspect ratio associated with the target video changes. Program instructions for determining a dissimilarity value between the frame of the video clip and the frame of the target video are included.

In yet another embodiment, a computer readable medium having program instructions for executing a matching technique for detecting copies of a video clip is provided. The computer readable medium includes program instructions for comparing temporal trails of intensity distributions between the video clip and a target video.

In still yet another embodiment, a computer is provided. The computer includes a central processing unit (CPU) and a memory. Video copy detection logic configured to detect copies of a video clip is included. The video copy detection logic includes logic for partitioning a frame of the video clip and a frame of a target video and logic for determining a spatial dissimilarity between a rank matrix associated with the frame of the video clip and a rank matrix associated with the frame of the target video. Logic for determining a direction of intensity distribution between corresponding partitions of sequential frames of the video clip and respective sequential frames of the target video is included in the video copy detection logic. A bus interconnecting the CPU, the memory and the video detection logic is included.

In another embodiment, an integrated circuit is provided. The integrated circuit includes logic for combining a spatial distance value defined between a partition of a target video frame and a corresponding partition of a query video frame with a temporal distance value associated with the partition of the target video frame and the corresponding partition of the query video frame to define a dissimilarity value. Logic for determining if the dissimilarity value is a local minimum is also included.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 1A and 1B illustrate common techniques used to change aspect ratios for video data.

FIGS. 2A-2C are graphical representations of the use of ordinal measures for copy detection.

FIGS. 3A-1 through 3B-3 illustrate intensity distributions of an image where the image is partitioned differently.

FIGS. 4A and 4B illustrate two sub-image sequences obtained from partitioning original image frames in accordance with one embodiment of the invention.

DETAILED DESCRIPTION OF THE PREFERRED EMBODIMENTS

Figure 5A:
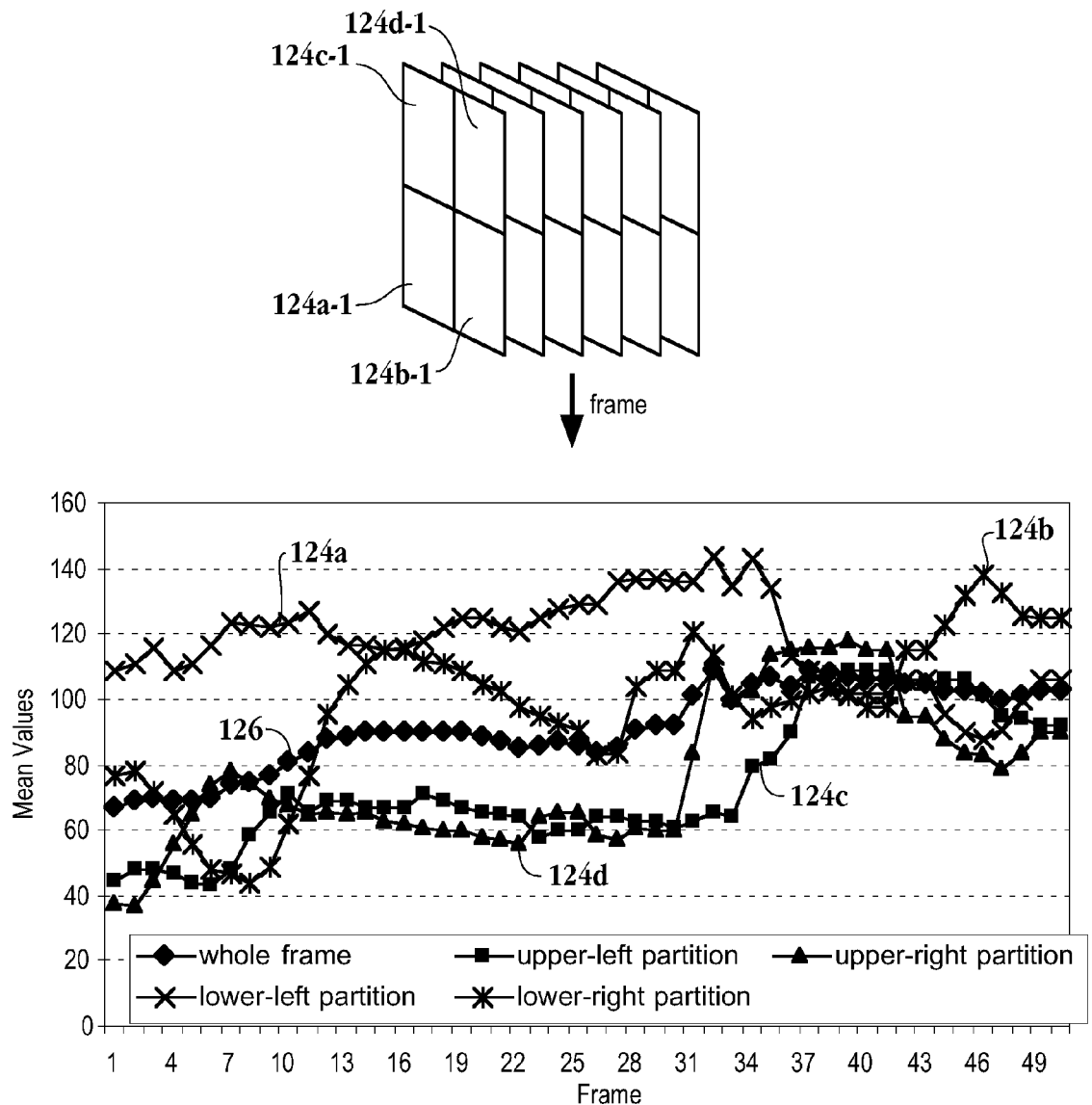
FIG. 5A is a graph illustrating the temporal variations of the mean values of intensity distributions for frames and their partitions in accordance with one embodiment of the invention.

An invention is described for a system, apparatus and method for detecting unauthorized video copies. It will be apparent, however, to one skilled in the art in light of the following, that the present invention may be practiced without some or all of these specific details. In other instances, well known process operations have not been described in detail in order not to unnecessarily obscure the present invention. FIGS. 1A and 1B are described in the "Background of the Invention" section.

The embodiments of the present invention provide system utilizing an algorithm for efficiently detecting copies of video data. As will be explained more fully below, copies that have been modified in terms of color and visible appearance, as well as spatial configuration, e.g., aspect ratio, can be identified routinely. In the use of ordinal measures for stereo image matching, the ordinal variable may be drawn from a discrete ordered set, such as the grades in schools. Here, the ratio between two measurements is not of importance; only the relative ordering is relevant. The relative ordering between measurements is expressed by their ranks. A rank permutation is obtained by sorting the measurements in ascending order and labeling them using integers [1,2,3, . . . , N], N being the number of the measurements.

FIGS. 2A-2C are graphical representations of the use of ordinal measures for copy detection. FIG. 2A represents image 104 partitioned into m×n (3×3) equal-sized blocks. It should be appreciated that partitioning an image into m×n equal-sized blocks makes the system independent of input image sizes. An m×n sub-image 106 of FIG. 2B is calculated by taking the average value of each corresponding block of image 104 of FIG. 2A. This array is converted to rank matrix 108 as shown in FIG. 2C. Suppose that the intensity values in sub-image 106 of FIG. 2B are each increased by 10 in the copied image so the sub-image has values: {{174, 71, 56}, {145, 156, 126}, {195, 184, 155}}. Nevertheless, the rank matrix of the sub-image with increased values is identical to that shown in FIG. 2C and thus perfect matching with an original image can be achieved.

However, the use of ordinal measures as described above, will not detect a copy that has been modified in an irregular way, especially if an image's spatial outlay is modified. FIGS. 3A-2 through 3B-3 illustrate intensity distributions of image 3A-1 where the image is partitioned differently. FIG. 3A-1 is original image 110a, while FIG. 3A-2 represents intensity distribution 112 of a 2×2 partition of image 110a. FIG. 3A-3 illustrates intensity distribution 114 of a 3×3 partition of image 110a. FIG. 3B-1 is a spatially modified image 110b of image 110a of FIG. 3A-1. Here the 4×3 video format of FIG. 3A-1 has been reformatted to a letter box format. As can be seen by comparing FIGS. 3A-2 and 3B-2, the intensity distributions, i.e., the ordinal measures, are invariant when the partitions are 2×2, since changes in the partition values are symmetric. For example, the ordinal measures for intensity distribution 112 and 116 remain the same since the intensity distributions are similarly impacted by the aspect ratio change, i.e., each of the partitions is evenly darkened. However, when the number of partitions is greater than 2×2, the asymmetrical changes will induce changes in ordinal measures as illustrated by comparing the shading, which represents the degree of intensity distribution, of the partitions for FIGS. 3A-3 and 3B-3. For example, the ordinal measures for intensity distribution 114 and 118 change since the intensity distributions are impacted differently, i.e., are asymmetrical. The letter box format basically darkens the lower and upper partitions and does not affect the middle partitions. Consequently, one of the major issues in designing an efficient video copy detector is to consider the impact of aspect ratio changes. It will be apparent to one skilled in the art that the above analysis is applicable to a pillar box format change or any other suitable aspect ratio change. As described in more detail below, a matching method which is based on ordinal measures of 2×2 partitioned image frames is provided, where the ordinal measures of the matching method are invariant to changes in the aspect ratio of the video data.

One skilled in the art will appreciate that there are two issues concerning the performance of a copy detection technique; robustness and discriminability. The robustness determines the amount of data inconsistency that can be tolerated by the system before mismatches begin to occur, while the discriminability is concerned with the technique's ability to reject irrelevant data such that false detections do not occur. A critical factor balancing between those conflicting issues is the number of partitions. As might be expected, the system becomes more robust as the number of partitions is reduced. On the contrary, the discriminability becomes high as the number of partitions increases. Thus, previous techniques have utilized partitions greater than 2×2 in order to increase the discriminability while still maintaining acceptable robustness. Since the discriminability might be lowered due to adopting a small number of partitions, e.g., 2×2, the embodiments described herein will exploit not only ordinal signatures of the video data, but also temporal signatures to enhance the discriminability.

The traditional video matching techniques mostly have relied on image correspondence. The distance between two video sequences is computed by combining dissimilarities of corresponding frames. However, the failure to notice the temporal variation of videos may lead to many false detections of copies. FIGS. 4A and 4B illustrate two sub-image sequences obtained from partitioning original image frames in accordance with one embodiment of the invention. The two sub-image sequences include sequence 1, represented by frames 120a-120d in FIG. 4A and sequence 2 122a-122d in FIG. 4B, have different temporal variations. However, the ordinal signatures between corresponding sub-images are identical. It should be appreciated that the traditional image frame matching based methods would fail to reject these irrelevant videos since the temporal information is not taken into account. By considering the temporal information of the video data, as well as the sequence of the ordinal signatures, a more efficient way of video matching is provided as discussed below.

As used herein, $V=\langle V[0], \ldots, V[n-1]\rangle$ denotes a video with n frames and $V[i]=\langle V^1[i], \ldots, V^m[i]\rangle$ denotes a i-th frame with m partitions. Then $V^j$ denotes a sequence of the j-th partitions. A sub-video of V is defined as $V[p: p+N-1]$, in which the number of frames is N and the first frame is $V[p]$, $0 \leq p \leq n-N$.

Thus, the problem of video copy detection may be defined as that of determining if a copy for a given video clip appears in the target video, and if so at what location. Formally, given a query video clip $V_q = \langle V_q[0], \ldots, V_q[N-1]\rangle$ and a target video $V_t = \langle V_t[0], \ldots, V_t[M-1]\rangle$, $N << M$, a sub-video $V_t[p: p+N-1]$ from the target video is a copy if the dissimilarity between two video clips, or $D(V_q, V_t[p: p+N-1])$ is less than a noise threshold $\epsilon$.

Where the [1×m] rank matrix of the i-th frame of the query video, $V_q[i]$ is $\pi_{q,i}$ and that of i-th frame from the target sub-sequence $V_t[p: p+N-1]$, is $\pi_{t,p+i}$, $0 \leq i \leq N-1$. Then, the spatial distance between two image frames can be defined as:

$$d(\pi_{q,i}, \pi_{t,p+i}) = \frac{1}{C} \sum_{j=1}^{m} |\pi_{q,i}^j - \pi_{t,p+i}^j|, \quad (1)$$

where $d(\pi_{q,i}, \pi_{t,p+i})$ is a normalized distance between two rank matrices and C is the maximum distance between two rank matrices $\pi_i$ and $\pi_j$, $\forall (\pi_i, \pi_j) \in S_m$. C is obtained when the two permutations are reverse of each other, and Sm is a set of all possible rank matrices with size m. C is 8 when m=4 in our case.

Then, the spatial dissimilarity between two sequences $D_S(V_q, V_t[p: p+N-1])$ is computed by averaging over N dissimilarities, i.e., $$D_S(V_q, V_t[p: p+N-1]) = \sum_{i=0}^{N-1} d(\pi_{q,i}, \pi_{t,p+i})/N. \quad (2)$$

One skilled in the art will appreciate that this measure can be viewed as a matching algorithm with 2×2 partitions.

Determining video matching based on a combination of image similarities, excludes the temporal characteristics of videos. Since a video is a process taking place in time, it should be appreciated that a temporal trail of the intensity distributions must be combined with image similarity measure. FIG. 5A is a graph illustrating the temporal variations of the mean values of intensity distributions for frames and their partitions in accordance with one embodiment of the invention. Here, the sequence of video frames are partitioned in a 2×2 configuration. As illustrated, the mean values of the intensity distributions for a partition has more variation as compared to those of the whole frame. That is, lines 124a-124d, which correspond to partitions 124a-1-124d-1, respectively, illustrate a higher degree of variation than line 126 which represents the intensity distribution of the whole frame.

Figure 5B:
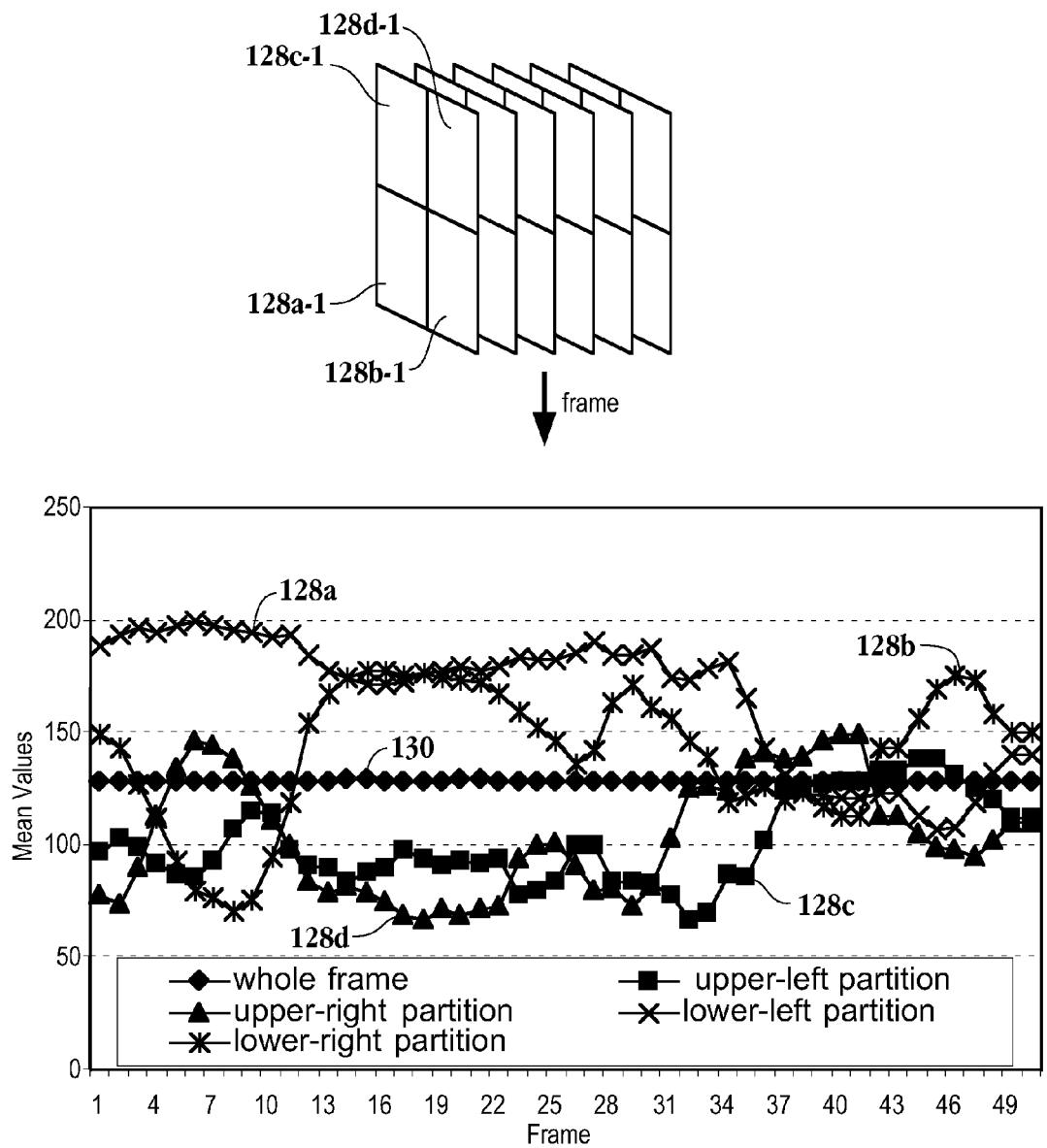
FIG. 5B is a graph illustrating the temporal variations of the mean values of intensity distributions for frames and their partitions where Histogram equalization has been applied for comparison with FIG. 5A.

FIG. 5B is a graph illustrating the temporal variations of the mean values of intensity distributions for frames and their partitions where Histogram equalization has been applied in accordance with one embodiment of the invention. As is the goal of Histogram equalization, the mean values of whole frames, as illustrated by line 130 becomes indistinctive as each frame is processed by histogram equalization and thus the mean of that frame is always adjusted to be the middle value of gray scale. Nevertheless, it is observed that the mean values of the intensity distribution of four partitions 128a-1-128d-1 still have discriminatory behaviors as illustrated by corresponding traces 128a-128d.

For temporal matching, temporal signatures, $\delta_i$, have been adopted. The temporal distance metric $D_T(V_q, V_t[p: p+N-1])$ is expressed by a normalized distance $d_T(\delta_q, \delta_t)$ as follows:

$$d_T(\delta_q, \delta_t) = \frac{1}{4(N-1)} \sum_{j=1}^{4} \left( \sum_{i=1}^{N-1} f(\delta_{q,i}^j - \delta_{t,p+i}^j) \right) \quad (3)$$

where $$f(x) = \frac{|x|}{2} \quad (4)$$

and $\delta_i^j$ is defined as $$\delta_i^j = \begin{cases} 1, & \text{if } V_i^j > V_{i-1}^j \\ 0, & \text{if } V_i^j = V_{i-1}^j \\ -1, & \text{if } V_i^j < V_{i-1}^j \end{cases} \quad (5)$$

It should be appreciated that $d_T$ estimates the degree of discordance, i.e., the number of corresponding pairs whose temporal changing is not in the same direction.

Figures 6, 7:
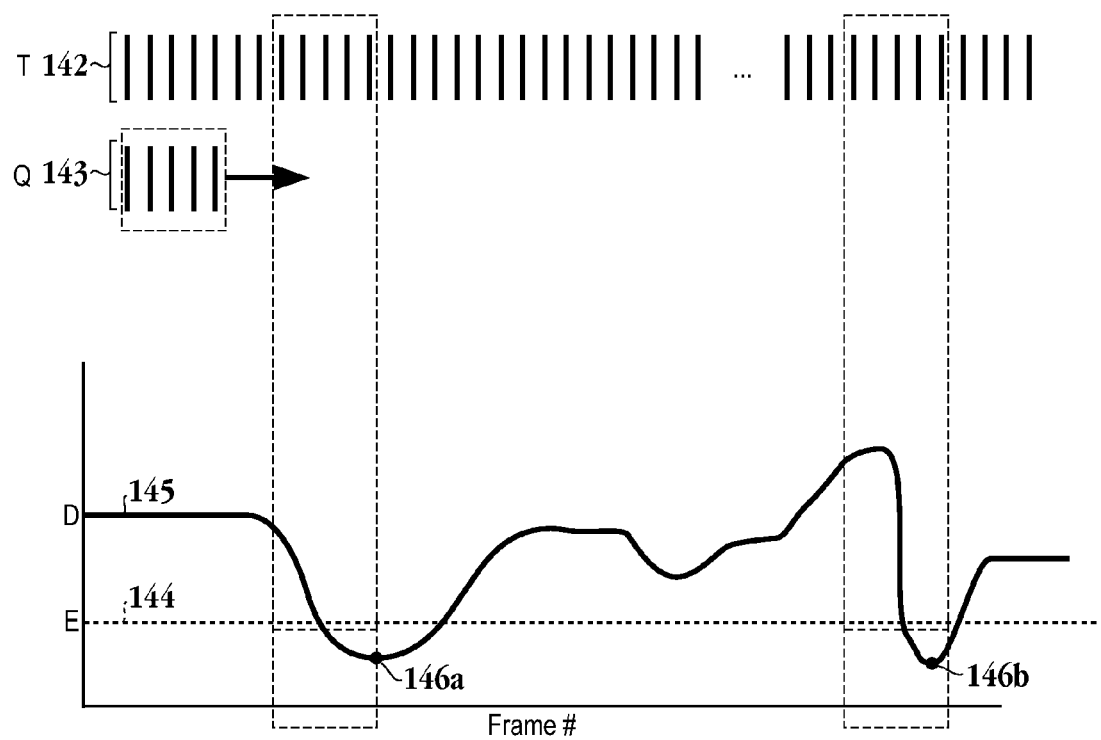
FIG. 6 illustrates a graphical representation of the procedure for computing $d_T(\delta_q, \delta_t)$ (the distance between two partitions) in accordance with one embodiment of the invention.
FIG. 7 is a simplified schematic diagram that provides a visual overview of the process for determining a match between a query video clip and a target video in accordance with one embodiment of the invention.

FIG. 6 illustrates a graphical representation of the procedure for computing $d_T(\delta_q, \delta_t)$ (the distance between two partitions) in accordance with one embodiment of the invention. Here, a sequence of numbers representing the intensity distribution for the jth partition of a query video and a target video are represented in rows 132 and 14, respectively. Row 134 represents the temporal signatures for the partitions of successive video frames of the query video. Here, the numbers from the first two frames are compared and since the numbers associated with these two frames, 100 and 103, respectively, are increasing, a 1 is assigned for the comparison in row 134. The same occurs for the target video in rows 140 and 138. Thus, if the successive numbers are increasing a 1 is assigned, if the successive numbers are decreasing a −1 is assigned, and if the successive numbers are equal a 0 is assigned in rows 134 and 138. The corresponding values of rows 134 and 138 are then compared to generate the values for row 136. Here, if the corresponding values of rows 134 and 138 are equal a one is assigned in row 136. If the corresponding values of rows 134 and 138 are 1 and −1, then a 1 is assigned in row 136. If the corresponding values of rows 134 and 138 are 1 and 0 or −1 and 0, then a 0.5 is assigned in row 136. Thus, FIG. 6 represents one embodiment for determining a direction associated with the temporal distribution of intensity between corresponding partitions of sequential frames of the video data and respective sequential frames of the target video.

The proposed methodology for measuring the dissimilarity between two videos relies on combination of $D_S$ and $D_T$, as represented in Equation 6 below:

$$D(V_q, V_t[p: p+N-1]) = \alpha D_S(V_q, V_t[p: p+N-1]) + (1-\alpha)D_T (V_q, V_t[p: p+N-1]), \quad (6)$$

where $\alpha \in [0,1]$ represents the trade-off between spatial and temporal distances.

Operations 1-4 listed below provide a high level overview of the proposed algorithm. Given a query video clip $V_q$ with N frames, and a target sequence $V_t$, $V_q$ is compared to a subsequence $V_t[p: p+N-1]$. The matching process has the following operations:

Operation 1. Set p to be 0.

Operation 2. Then the distance between two sequences $D(V_q, V_t[p: p+N-1])$ is computed.

Operation 3. Increase p by 1. Repeat Step 2 until p=n-N, where n is a number of frames in the target video.

Operation 4. From the sequence of distances, find local minima. If a local minimum is less than a predefined threshold value, the point is declared as the location of a copy.

FIG. 7 is a simplified schematic diagram that provides a visual overview of the process for determining a match between a query video clip and a target video in accordance with one embodiment of the invention. Video clip frames 143 (which may be referred to as the query video) are used to determine if any copies of the video clip is included in target video frames 142. For exemplary purposes, video clip frames 143 will be discussed as containing five frames. However, the query video clip may contain any suitable number of frames greater than one and is not limited to a particular number of frames. Thus, the spatial and the temporal distances discussed above are calculated and combined for each five frame video clip of target video frames 142. This distance is then presented below in the graph of FIG. 7. The spatial and temporal distance (D) is tracked by line 145, which is calculated by Equation 6 as described above. A local minima is found at points 146a and 146b. If the local minima is below a threshold ε, which is represented by line 144, then the frame associated with the local minima and the four preceding frames are identified as a copy of the five frames of the query video clip. It should be appreciated that a target video may have more than one copy of a query video. For example, where the target video is a television program and the query video clip is a commercial that ran during the program, the commercial may have been repeated a number of times during the program. It should be appreciated that FIG. 7 pictorially illustrates the process described by operations 1-4 above.

Figure 8:
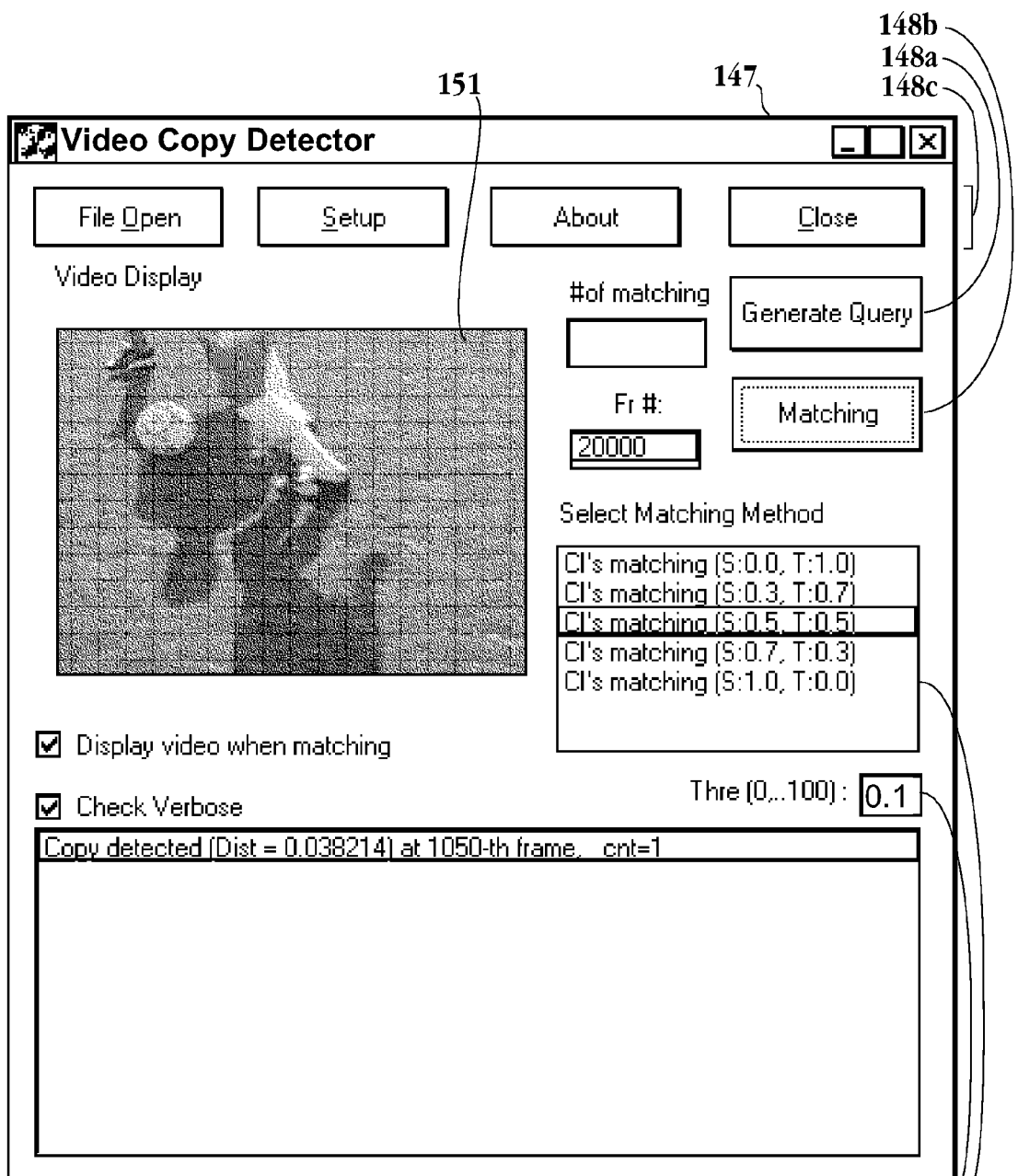
FIG. 8 illustrates an exemplary graphical user interface (GUI) of the implementation for the video copy detector described herein in accordance with one embodiment of the invention.

FIG. 8 illustrates an exemplary graphical user interface (GUI) of the implementation for the video copy detector described herein in accordance with one embodiment of the invention. The test video has in excess of 120,000 frames and is encoded in MPEG1 format. The test video, i.e., target video contains a variety type of sequences, such as sports, landscapes, home videos, etc. Region 149 of GUI 147 illustrates the matching technique being applied. The highlighted technique includes an a value of 0.5 and a (1−α) value of 0.5. Here, α is represented by S and 1−α is represented by T. Buttons 148a-c include general navigation buttons 148c, query generation button 148b and matching button 148a. Query generation button 148b initiates functionality to generate and partition a query image in one embodiment. Matching button 148c initiates functionality to search for a match of the query video clip in the target video clip. The target video clip may be displayed in region 151. The threshold applied for the determination of the local minima was 0.1 as displayed in region 153. As can be seen in region 149, the algorithm described herein was tested with five different α values: 0.0, 0.3, 0.5, 0.7, and 1.0. It should be noted that a low value of α will cause the algorithm to focus more on temporal matching, an α=0.5 provides a balanced matching between spatial and temporal matching, and an alpha close to 1 will focus more on spatial matching. Thus, through a the algorithm is adaptive to various spatial and temporal weighting.

Figure 9:
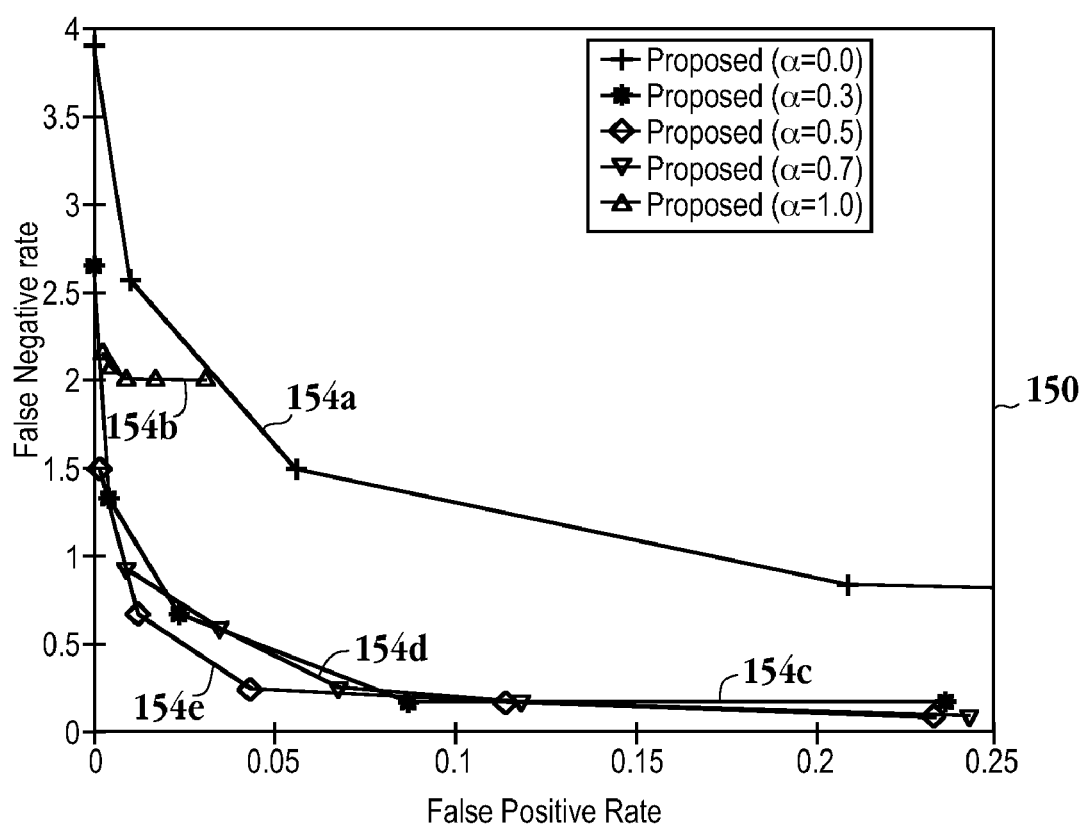
FIG. 9 is a graph illustrating the performances of the proposed algorithm using a receiver operating characteristics (ROC) curve in accordance with one embodiment of the invention.

FIG. 9 is a graph illustrating the performances of the proposed algorithm using a receiver operating characteristics (ROC) curve in accordance with one embodiment of the invention. One skilled in the art will appreciate that this is a plot of the false positive rate (FPR) versus the false negative rate (FNR). Let $N_T$ be the total number of frames on which match tests are conducted and let τ be the normalized threshold value. With FN the number of false negatives (number of copy clips that are not detected) and FP the number of false positives (number of non-copy clips that are detected), provides a false negative rate (FNR) and false positive rate (FPR) as follows:

$$FNR(\tau) = \frac{FN}{N_T}, FPR(\tau) = \frac{FP}{N_T}. \quad (7)$$

The points representing these rates are plotted on two dimensional graph 150 of FIG. 8 with changing thresholds as depicted by lines 154a-e. The ideal curve passes through (0,0), i.e., zero FNR and zero FPR. As shown in FIG. 8, the discriminability of the proposed algorithm was the highest when α=0.5, line 154e. This denotes that the performance of the proposed algorithm is best when spatio- and temporal matches are evenly balanced. For the test, 20 query clips were sampled from the test sequence. Every clip had 50 frames and 5 copy clips are generated from each query by using modifications such as pixel level boosts, histogram equalization, and format changes to letter box and pillar box style.

Figure 10A:
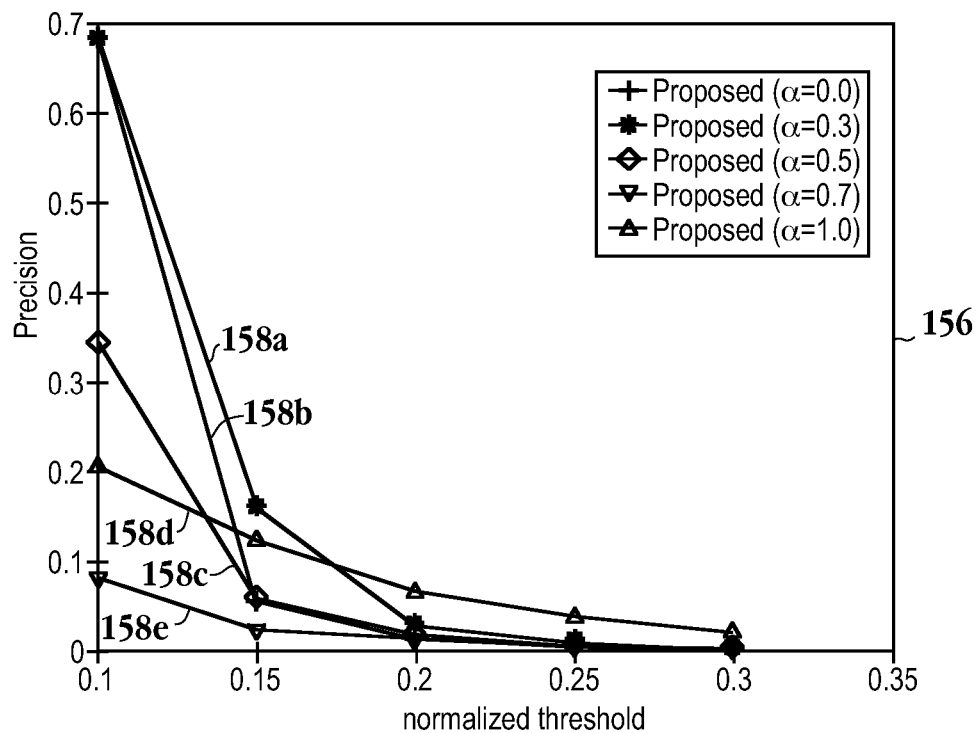
FIGS. 10A and 10B are graphs of the precision and recall rates, respectively, versus the normalized threshold values in accordance with one embodiment of the invention.
Figure 10B:
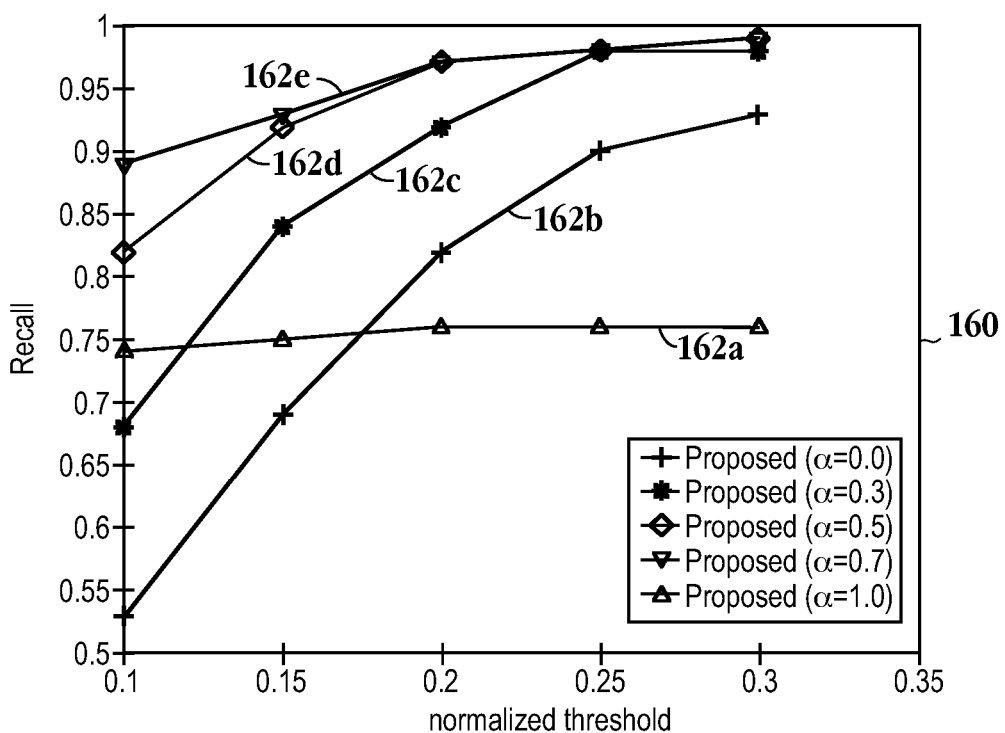

FIGS. 10A and 10B are graphs of the precision and recall rates, respectively, versus the normalized threshold values in accordance with one embodiment of the invention. One skilled in the art will appreciate that to choose the appropriate threshold value, these rates are to be considered. At a certain threshold τ, the precision and recall rates are defined as follows:

$$\text{Precision}(\tau) = \frac{\text{number of matched copy clips}}{\text{number of matched clips}}, \quad (8)$$

$$\text{Recall}(\tau) = \frac{\text{number of matched copy clips}}{\text{number of total copy clips}}, \quad (9)$$

where τ is the normalized threshold. It should be appreciated that matched clips, refers to clips detected as a copy (which may include false positives). Matched copy clips, also referred to as detected copy clips, denotes the real copy clips, i.e., the actual matched copies disregarding false positives, among the clips detected as a copy. Total copy clips indicates the real copy clips existing through the target video. In FIGS. 10A and 10B it is illustrated that the desirable results are obtained at τ=0.1, where both of rates are high. In graph 156 of FIG. 10A, from the comparison of lines 158a-e, line 158e provides the best precision. In graph 160 of FIG. 10B, from the comparison of lines 162a-e, line 162e provides the best recall. Thus, in both cases α=0.7.

Figure 11:
FIG. 11 is a bar graph illustrating the precision and recall rates when τ is 0.1 in accordance with one embodiment of the invention.

FIG. 11 is a bar graph illustrating the precision and recall rates when τ is 0.1 in accordance with one embodiment of the invention. Note that having the higher recall rate is of more importance to minimize the number of missing copies. As illustrated in FIG. 11, when α=0.7, the algorithm has the highest recall rate. However, the precision rate with the value of α, is low, which means too many false detections exist. Therefore, the system parameters are settled to be α=0.5 and τ=0.1. It should be appreciated that these parameters are exemplary for a specific illustration presented to further define the functionality of the invention. Thus, depending on the specific application, the optimal parameters will be different than the exemplary parameters discussed above.

Figure 12:
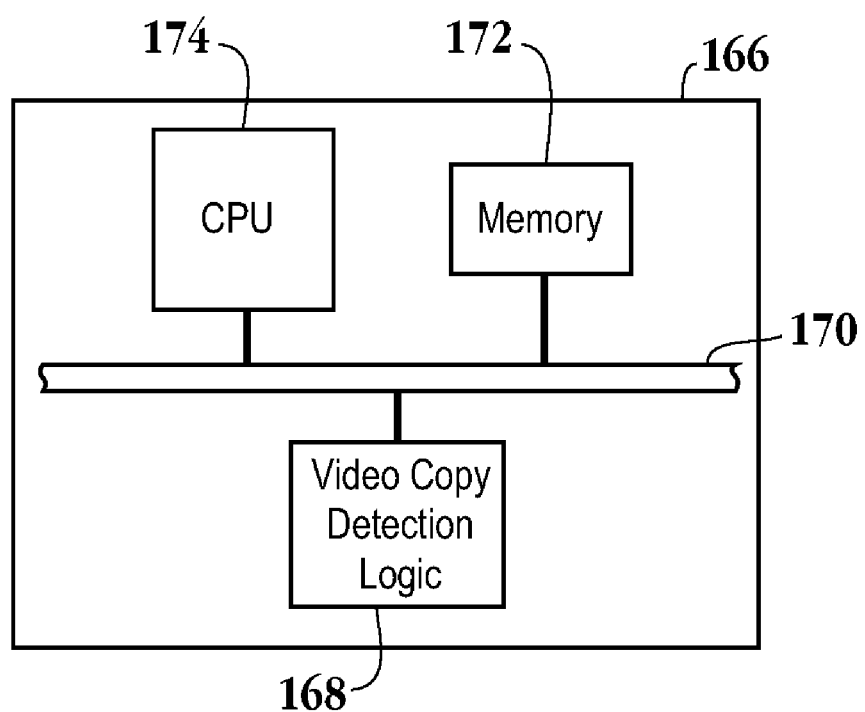
FIG. 12 is a simplified diagram illustrating a video copy detection system in accordance with one embodiment of the invention.

FIG. 12 is a simplified diagram illustrating a video copy detection system in accordance with one embodiment of the invention. Video copy detection system 166 includes central processing unit (CPU) 174, memory 172, video copy detection logic 168, all interconnected by bus 170. It should be appreciated that video copy detection logic 168 includes logic for partitioning a frame of the video clip and a frame of a target video as described above. For example, with reference to FIG. 2, the logic for partitioning each frame is configured to partition each frame in a 2×2 matrix. Video copy detection logic 168 also includes logic for determining a spatial dissimilarity between a rank matrix associated with a frame of the video clip and a rank matrix associated with the frame of the target video. As mentioned above, the spatial dissimilarity between two sequences is computed by calculating the spatial distance between two image frames. Video copy detection logic 168 further includes logic for determining a direction of intensity distribution between corresponding partitions of sequential frames of the video clip and respective sequential frames of the target video. Here, the direction of intensity distribution creates a temporal trail in order to account for temporal variations as the video takes place over time.

As mentioned above with reference to FIGS. 6 and 7, the values representing the spatial dissimilarity and the corresponding values representing the direction of the intensity distribution are combined for corresponding partitions, thereby resulting in a sequence of values. In one embodiment, a first sequence is associated with the temporal intensity change of successive partitions for the video clip, while a second sequence of values is associated with the temporal intensity change corresponding to the target video. The first sequence of values and the second sequence of values are then compared to determine whether the values are changing in a similar direction as discussed with reference to FIG. 6. One skilled in the art will appreciate that the video copy detection logic 168 may be embodied as hardware, software or some combination of both. The hardware configuration may include an integrated circuit containing circuitry configured to execute the functionality described herein. Of course the integrated circuit may be included on a plug-in board or adapter card.

Figure 13:
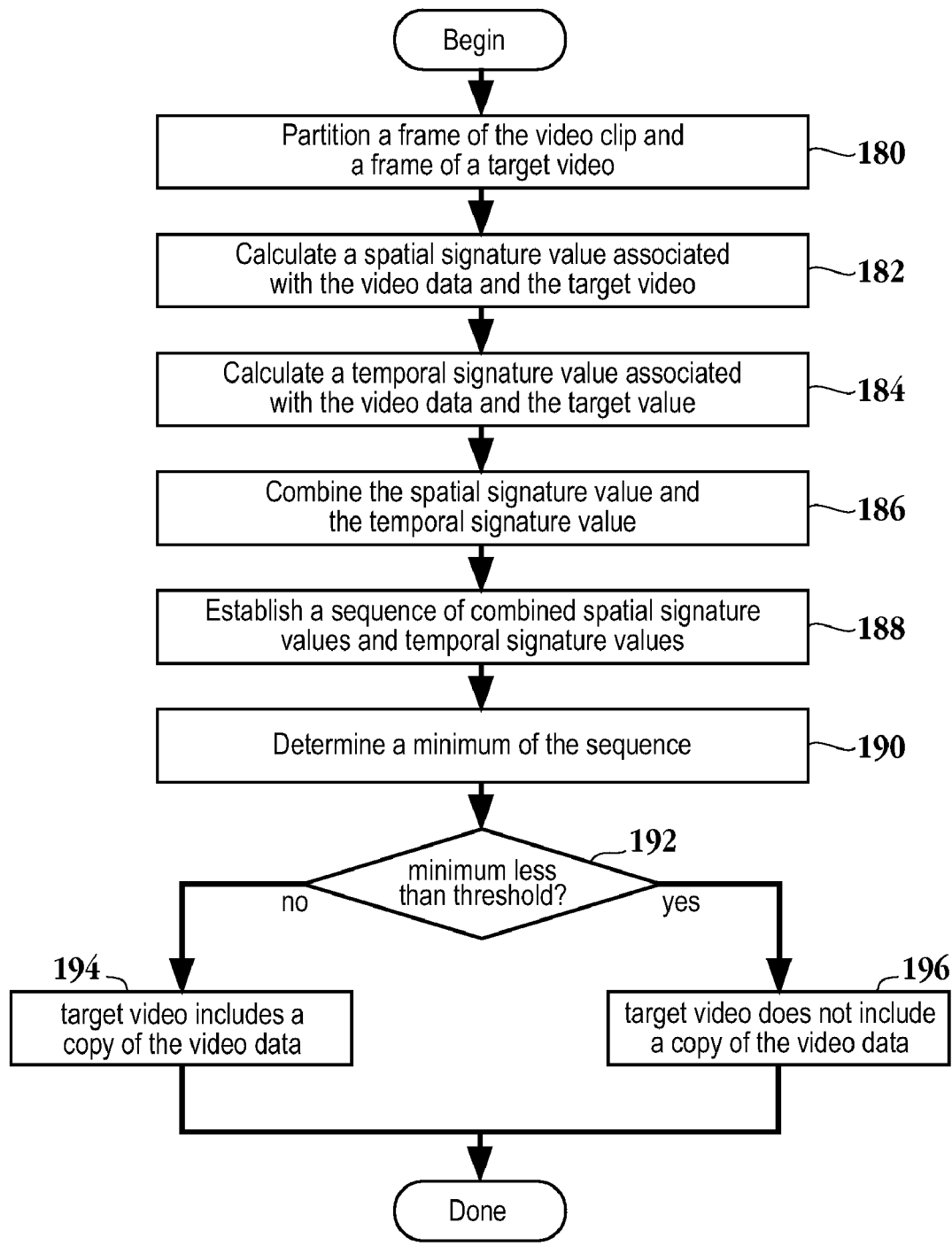
FIG. 13 is a flow chart diagram illustrating the method operations for detecting whether video data appears in the target video in accordance with one embodiment of the invention.

FIG. 13 is a flow chart diagram illustrating the method operations for detecting whether video data appears in the target video in accordance with one embodiment of the invention. The method initiates with operation 180 where both a frame of the video clip and a frame of the target video are partitioned. As mentioned above, the frame of the video clip and the frame of the target video are partitioned in a 2×2 matrix so that ordinal measures associated with the target video are invariant when an aspect ratio associated with the target video changes. For example, if an aspect ratio of the target video is changed to a pillar box or a letter box configuration, the 2×2 configuration will accommodate these changes so that ordinal measures associated with the target video are not affected. The method then advances to operation 182 where a spatial signature value associated with the video data and the target video are calculated. As mentioned above, the spatial signature value represents the spatial distance between two image frames. For example, the spatial distance may be represented as a normalized distance between two rank matrices as discussed above.

The method of FIG. 13 then moves to operation 184 where a temporal signature value associated with the video data and the target video are calculated. It should be appreciated that the temporal signature value represents a temporal distance metric that is expressed by a normalized distance. In other words, the temporal signature value includes an estimate of the degree of discordance, i.e., the number of corresponding pairs whose temporal change is not in the same direction, as described with reference to FIG. 6. The method then proceeds to operation 186 where the spatial signature value and the temporal signature value are combined. Here, the spatial signature value and the temporal signature value may be combined as illustrated above with reference to equation 6. As described therein, a tradeoff value is provided between the spatial and temporal distances.

It should be appreciated that the spatial signature value and the temporal signature value are combined for each partition for a sequence of frames, thereby resulting in a sequence of combined spatial signature values and corresponding temporal signature values as referenced in operation 188. In operation 190 a minimum of the sequence established in operation 188 is determined. Thereafter, in decision operation 192 it is determined if the minimum from operation 190 is below a threshold value. Here one or more local minima may be found as discussed with reference to FIG. 7. If the local minimum is below a threshold value, then the target video includes a copy of the video data, and is marked as such. If the minimum is greater than the threshold value in decision operation 192, then the target video does not include a copy of the video data as represented in operation 196.

In summary, the above described invention detects unauthorized copies of a video clip. Through the use of spatial and temporal factors, a 2×2 partitioned image is used for the query and target video data. As the spatial factor is associated with a low discriminability because of the small number of partitions, the temporal factor is included to enhance the discriminability sacrificed by the partition configuration. As described above, the partition configuration is capable of evaluating aspect ratio changes applied to the target video. Additionally, the memory requirement for storing/indexing the signatures associated with the embodiments described above is 4 bytes per frame, which is relatively small when compared to the memory requirements for video copy detection based solely upon spatial matching.

Furthermore, the embodiments described herein may be incorporated into multimedia search engines. As these engines are getting cluttered with a large number of copies, e.g., among retrieval results several copies might exist, which prevents users from prompt browsing. Therefore a scheme to detect and remove copies from the retrieval results before displaying as described above, may be utilized to prevent the copies. In addition, the content-based video copy detection scheme is also useful for media tracking. Media tracking refers to keeping track of when and where a particular known piece of media has been used. For example, monitoring a particular TV commercial for market research is a specific application of the media tracking. In detail, one might want to know when and how many times, and on which channel a competitor's commercial is aired. By doing so, the competitor's marketing strategy can be apprehended. Media tracking is also useful in relation to right management and royalty payments.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for detecting whether video data appears in a target video, comprising the operations of:
   calculating a spatial distance between two spatial signatures associated with the video data and the target video;
   calculating a temporal distance between two temporal signatures associated with the video data and the target video;
   combining the spatial distance and the temporal distance including;
      adjusting the spatial distance by a value;
      adjusting the temporal distance by 1 minus the value, wherein the value is a number between 0 and 1; and
   determining whether the video data appears in the target video based upon the combined spatial distance and the temporal distance.

2. The method of claim 1, further comprising:
   calculating a spatial signature value associated with the video data and the target video;
   calculating a temporal signature value associated with the video data and the target video; and
   partitioning a frame of the video data and a corresponding frame of the target video into a configuration that compensates for aspect ratio changes of the corresponding frame of the target video.

3. The method of claim 1, wherein the method operation of calculating a spatial signature value associated with the video data and the target video includes,
   determining both a first ordinal measure for a frame of the video data and a second ordinal measure for a frame of the target video; and
   computing a spatial distance between the first ordinal measure and the second ordinal measure.

4. The method of claim 1, wherein the method operation of calculating a temporal signature value associated with the video data and the target video includes,
   determining a direction of temporal distribution of intensity between corresponding partitions of sequential frames of the video data and respective sequential frames of the target video.

5. A computer readable medium encoded with a computer program to perform the method of claim 1.

6. A computer, comprising:
   a central processing unit (CPU);
   a memory; and
   video copy detection logic configured to perform the method of claim 1.

7. An integrated circuit for performing the method of claim 1.

8. A method for detecting copies of a video clip, comprising the operations of:
   partitioning both a frame of the video clip and a frame of a target video so that ordinal measures associated with the target video are invariant when an aspect ratio associated with the target video changes; and
   determining a dissimilarity value between the frame of the video clip and the frame of the target video includes:
      calculating a spatial dissimilarity value based on differences between a rank matrix of the frame of the video clip and a rank matrix of the frame of the target video;
      calculating a temporal distance metric based on temporal signatures of the video clip and temporal signatures of the target video, wherein the temporal signature is based on a direction of chance in intensity of a partition of a frame relative to a corresponding partition of a sequential frame; and
   combining the spatial dissimilarity value with the temporal distance metric.

9. The method of claim 8, wherein the method operation of partitioning both a frame of the video clip and a frame of a target video includes,
   subdividing both the frame of the video clip and the frame of the target video into four regions.

10. The method of claim 8, further comprising:
    repeating the partitioning and the determining;
    generating a sequence of dissimilarity values; and
    identifying a minimum of the sequence of dissimilarity values.

11. The method of claim 10, wherein the method operation of identifying a minimum of the sequence of dissimilarity values includes,
    determining on the central processing unit if the minimum is less than a threshold value; and
    if the minimum is below the threshold value then the method includes,
    identifying on the central processing unit a frame of the target video associated with the minimum as a copy of a corresponding frame of the video clip.

* * * * *

UNITED STATES PATENT AND TRADEMARK OFFICE
CERTIFICATE OF CORRECTION

PATENT NO. : 7,532,804 B2
APPLICATION NO. : 10/778464
DATED : May 12, 2009
INVENTOR(S) : Changick Kim It is certified that error appears in the above-identified patent and that said Letters Patent is hereby corrected as shown below:

Column 13, line 9 after "video" insert --as implemented on a central processing unit,--

Column 13, line 10 after "calculating" insert --on the central processing unit--

Column 13, line 12 after "calculating" insert --on the central processing unit--

Column 13, line 15, after "combining" insert --on the central processing unit-- after "distance" insert --;-- and delete "including" insert --and--

Column 13, delete "lines 17, 18 and 19"

Column 13, line 20 after "determining" insert --on the central processing unit--

Column 13, line 24 after "calculating" insert --on the central processing unit--

Column 13, Line 26 after "calculating" insert --on the central processing unit--

Column 13, Line 28 after "partitioning" insert --on the central processing unit--

Column 13, Line 35, after "determining" insert --on the central processing unit--

Column 13, Line 38 after "computing" insert --on the central processing unit--

Column 13, Line 43, after "determining" insert --on the central processing unit--

UNITED STATES PATENT AND TRADEMARK OFFICE
CERTIFICATE OF CORRECTION

PATENT NO. : 7,532,804 B2
APPLICATION NO. : 10/778464
DATED : May 12, 2009
INVENTOR(S) : Changick Kim It is certified that error appears in the above-identified patent and that said Letters Patent is hereby corrected as shown below:

Column 14, line 10 after "partitioning" insert --on the central processing unit--

Column 14, Line 14 after "determining" insert --on the central processing unit--

Column 14, Line 15 after "target video" insert --.-- and delete "includes"

Column 14, delete lines "16, 17, 18, 19, 20, 21, 22, 23, 24, 25 and 26"

Column 14, Line 30 after "subdividing" insert --on the central processing unit--

Column 14, Line 33 after "determining" insert --on the central processing unit--

Column 14, Line 34 after "generating" insert --on the central processing unit--

Column 14, Line 35 after "identifying" insert --on the central processing unit--

Signed and Sealed this

Thirteenth Day of October, 2009

David J. Kappos
*Director of the United States Patent and Trademark Office*